(12) United States Patent
Tokutomi

(10) Patent No.: US 12,515,422 B2
(45) Date of Patent: Jan. 6, 2026

(54) FORMING DEVICE AND FORMING METHOD

(71) Applicant: MITSUBISHI HEAVY INDUSTRIES, LTD., Tokyo (JP)

(72) Inventor: Hiroshi Tokutomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 253 days.

(21) Appl. No.: 18/139,596

(22) Filed: Apr. 26, 2023

(65) Prior Publication Data

US 2024/0198612 A1    Jun. 20, 2024

(30) Foreign Application Priority Data

Dec. 16, 2022   (JP) ................................. 2022-201448

(51) Int. Cl.
*B29C 53/04*    (2006.01)
*B29C 53/82*    (2006.01)
*B29C 70/34*    (2006.01)
*B29C 70/42*    (2006.01)
(Continued)

(52) U.S. Cl.
CPC ................ *B29D 7/01* (2013.01); *B29C 53/04* (2013.01); *B29C 53/82* (2013.01); *B29C 70/34* (2013.01); *B29C 70/42* (2013.01); *B29C 70/549* (2021.05)

(58) Field of Classification Search
CPC ......... B29C 53/04; B29C 53/80; B29C 53/82; B29C 70/34; B29C 70/342; B29C 70/345; B29C 70/40; B29C 70/42; B29C 70/44; B29C 70/446; B29C 70/46; B29C 70/462; B29C 70/54; B29C 70/541; B29C 70/542;
(Continued)

(56) References Cited

U.S. PATENT DOCUMENTS

| 11,155,069 B2 | 10/2021 | Pham et al. |
| 2015/0343716 A1* | 12/2015 | Feeney ................. B29C 70/543 425/500 |

(Continued)

FOREIGN PATENT DOCUMENTS

| WO | WO-2020162077 A1 * | 8/2020 | ............. B29C 70/30 |
| WO | WO-2022040708 A1 * | 3/2022 | ........... B29C 53/043 |

*Primary Examiner* — Michael A Tolin
(74) *Attorney, Agent, or Firm* — Birch, Stewart, Kolasch & Birch, LLP

(57) ABSTRACT

Provided is a forming device including a forming tool including a first forming member, a second forming member, and a maintaining member maintaining a state in which a first region of a laminate is sandwiched between the first forming member and the second forming member, a rotation mechanism rotating the forming tool around a rotation axis X, and a first forming sheet including one end fixed to the second forming member and another end fixed to a first predetermined position, wherein the first forming member includes a first contact surface coming into contact with the first region and a first forming surface inclined at a first predetermined angle with respect to a width direction, and the rotation mechanism performs a forming operation of rotating the forming tool around the rotation axis X, thereby pressing, by the first forming sheet in contact with the second surface of the laminate, the first surface of the laminate against the first forming surface to bend the laminate.

6 Claims, 10 Drawing Sheets

(51) Int. Cl.
 *B29C 70/54* (2006.01)
 *B29D 7/01* (2006.01)
(58) Field of Classification Search
 CPC ..... B29C 70/543; B29C 70/549; B29C 70/56; B29D 99/0003
 See application file for complete search history.

(56) References Cited

U.S. PATENT DOCUMENTS

| | | | | |
|---|---|---|---|---|
| 2016/0121589 | A1* | 5/2016 | Pham | B29C 70/342 |
| | | | | 156/538 |
| 2022/0097322 | A1* | 3/2022 | Kitazawa | B32B 37/0076 |
| 2022/0410507 | A1* | 12/2022 | Yamato | B29C 70/302 |
| 2023/0249414 | A1* | 8/2023 | Ahrer | B29C 53/043 |
| | | | | 264/138 |

* cited by examiner

FORMING DEVICE AND FORMING METHOD

CROSS-REFERENCE TO RELATED APPLICATIONS

This application claims the benefit of priority to Japanese Patent Application Number 2022-201448 filed on Dec. 16, 2022. The entire contents of the above-identified application are hereby incorporated by reference.

TECHNICAL FIELD

The disclosure relates to a forming device and a forming method for forming a laminate in which a plurality of sheet materials containing reinforced fibers are laminated.

RELATED ART

A composite structural member of an aircraft has a given cross-sectional shape. In a known method for manufacturing the composite structural member, a laminate in which a plurality of sheet materials containing reinforced fibers are laminated is pressed against a forming tool and formed into a target shape (see, for example, U.S. Pat. No. 11,155,069). U.S. Pat. No. 11,155,069 discloses that a laminate is placed at a forming tool having a Z-shaped cross section and sealed with a vacuum bag, and a space sealed with the vacuum bag is depressurized, so that the laminate is formed into a Z shape.

SUMMARY

However, in the forming method disclosed in U.S. Pat. No. 11,155,069, a pressing force applied from the laminate to the forming tool by depressurizing the space sealed with the vacuum bag is lower in a recessed region of the forming tool than in other regions, and it is difficult to faithfully bend the laminate along the shape of the forming tool. In addition, when the vacuum bag deteriorates or is stretched out, a pressing force applied from the laminate to the forming tool in the recessed region of the forming tool is further reduced significantly.

The disclosure has been made in view of such circumstances, and an object thereof is to provide a forming device and a forming method capable of faithfully bending a laminate along the shape of a forming tool.

A forming device according to an aspect of the disclosure is a forming device for forming a laminate in which a plurality of sheet materials containing reinforced fibers are laminated, the forming device including a forming tool including a first forming member configured to come into contact with a first surface of the laminate, a second forming member configured to come into contact with a second surface of the laminate, and a maintaining member configured to maintain a state in which a first region of the laminate is sandwiched between the first forming member and the second forming member and disposed along a predetermined direction, a rotation mechanism configured to rotate the forming tool around a rotation axis orthogonal to the predetermined direction, and a first forming sheet including one end fixed to the second forming member at a position facing a second region adjacent to the first region, and another end fixed to a first predetermined position, wherein the first forming member includes a first contact surface extending along the predetermined direction while coming into contact with the first region of the laminate, and a first forming surface inclined at a first predetermined angle with respect to the predetermined direction, and the rotation mechanism performs a forming operation of rotating the forming tool around the rotation axis, thereby pressing, by the first forming sheet in contact with the second surface of the laminate, the first surface of the laminate against the first forming surface to bend the laminate.

A forming device according to another aspect of the disclosure is a forming method for forming, by a forming device, a laminate in which a plurality of sheet materials containing reinforced fibers are laminated, wherein the forming device includes a forming tool including a first forming member configured to come into contact with a first surface of the laminate, a second forming member configured to come into contact with a second surface of the laminate, and a maintaining member configured to maintain a state in which a first region of the laminate is sandwiched between the first forming member and the second forming member and disposed along a predetermined direction, and a first forming sheet including one end fixed to the second forming member at a position facing a second region adjacent to the first region, and another end fixed to a first predetermined position, the first forming member includes a first contact surface extending along the predetermined direction while coming into contact with the first region of the laminate, and a first forming surface inclined at a first predetermined angle with respect to the predetermined direction, and the forming method includes forming the laminate, the forming including performing a forming operation of rotating the forming tool around a rotation axis orthogonal to the predetermined direction, thereby pressing, by the first forming sheet in contact with the second surface of the laminate, the first surface of the laminate against the first forming surface to bend the laminate.

According to the disclosure, it is possible to provide a forming device and a forming method capable of faithfully bending a laminate along the shape of a forming tool.

BRIEF DESCRIPTION OF DRAWINGS

The disclosure will be described with reference to the accompanying drawings, wherein like numbers reference like elements.

DESCRIPTION OF EMBODIMENTS

First Embodiment

Figure 1:
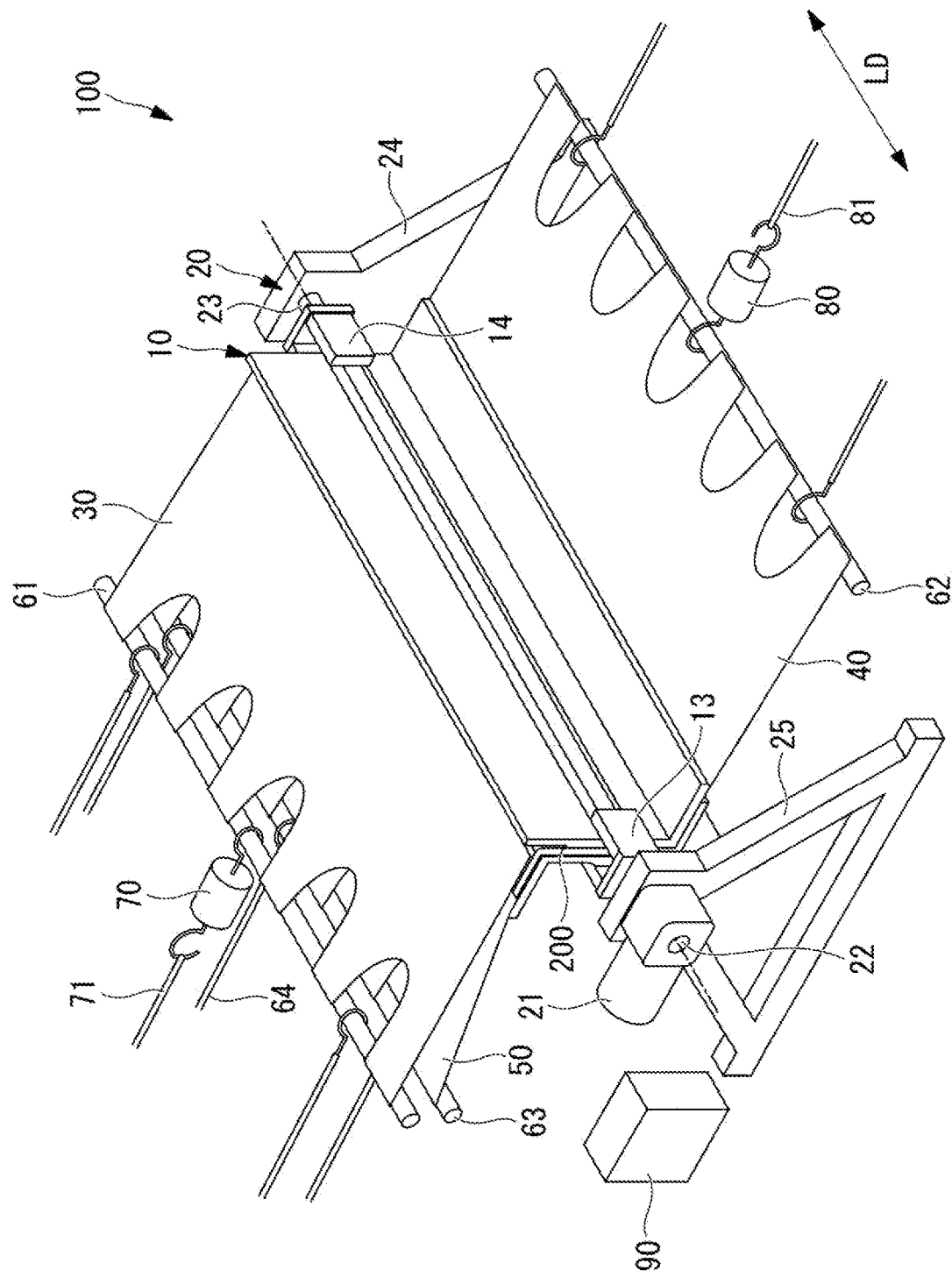
FIG. 1 is a perspective view illustrating a forming device according to a first embodiment of the disclosure and illustrates a state after a forming operation is performed.
Figure 2:
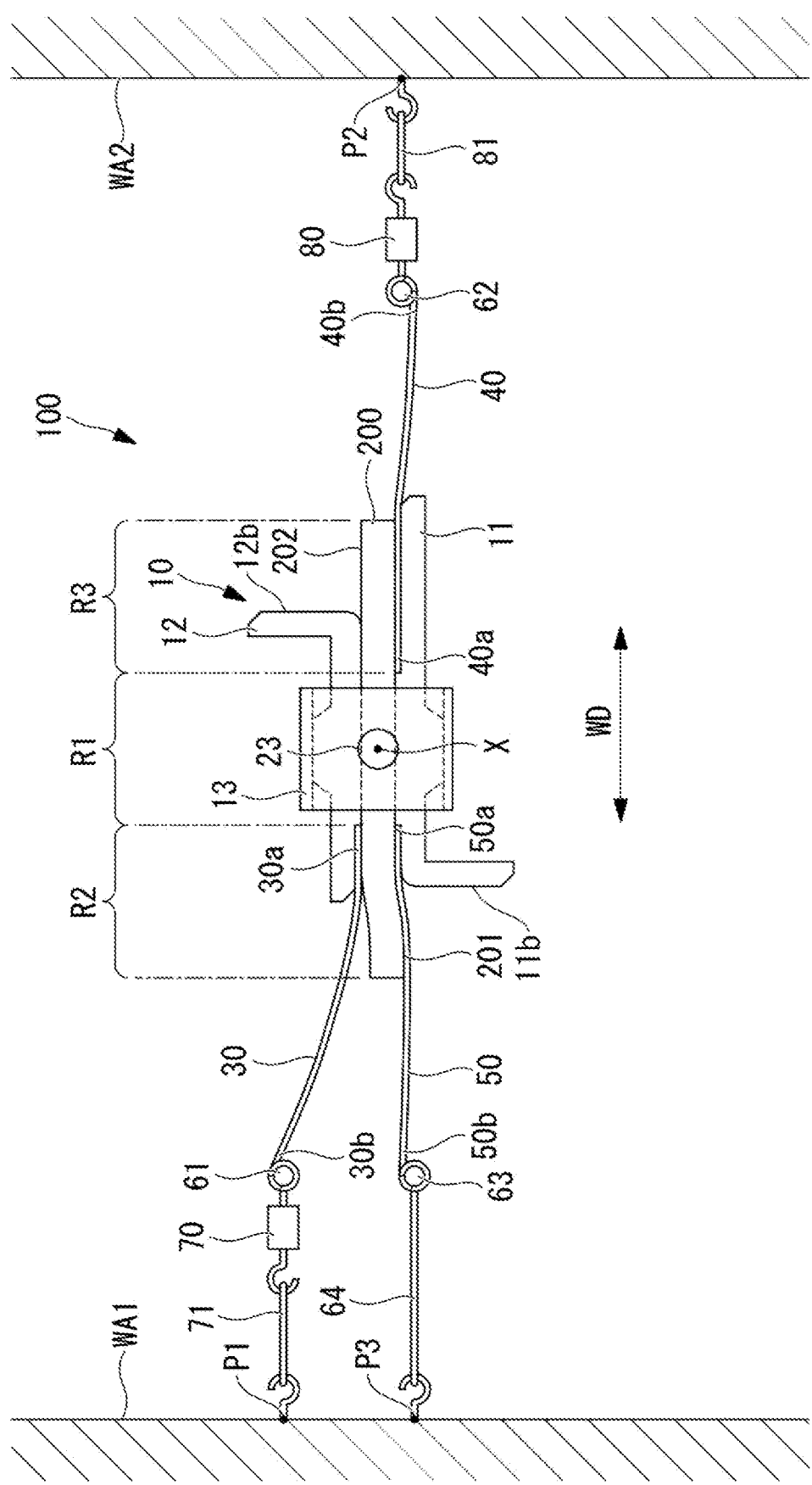
FIG. 2 is a front view illustrating the forming device according to the first embodiment of the disclosure and illustrates a state before the forming operation is performed.
Figure 3:
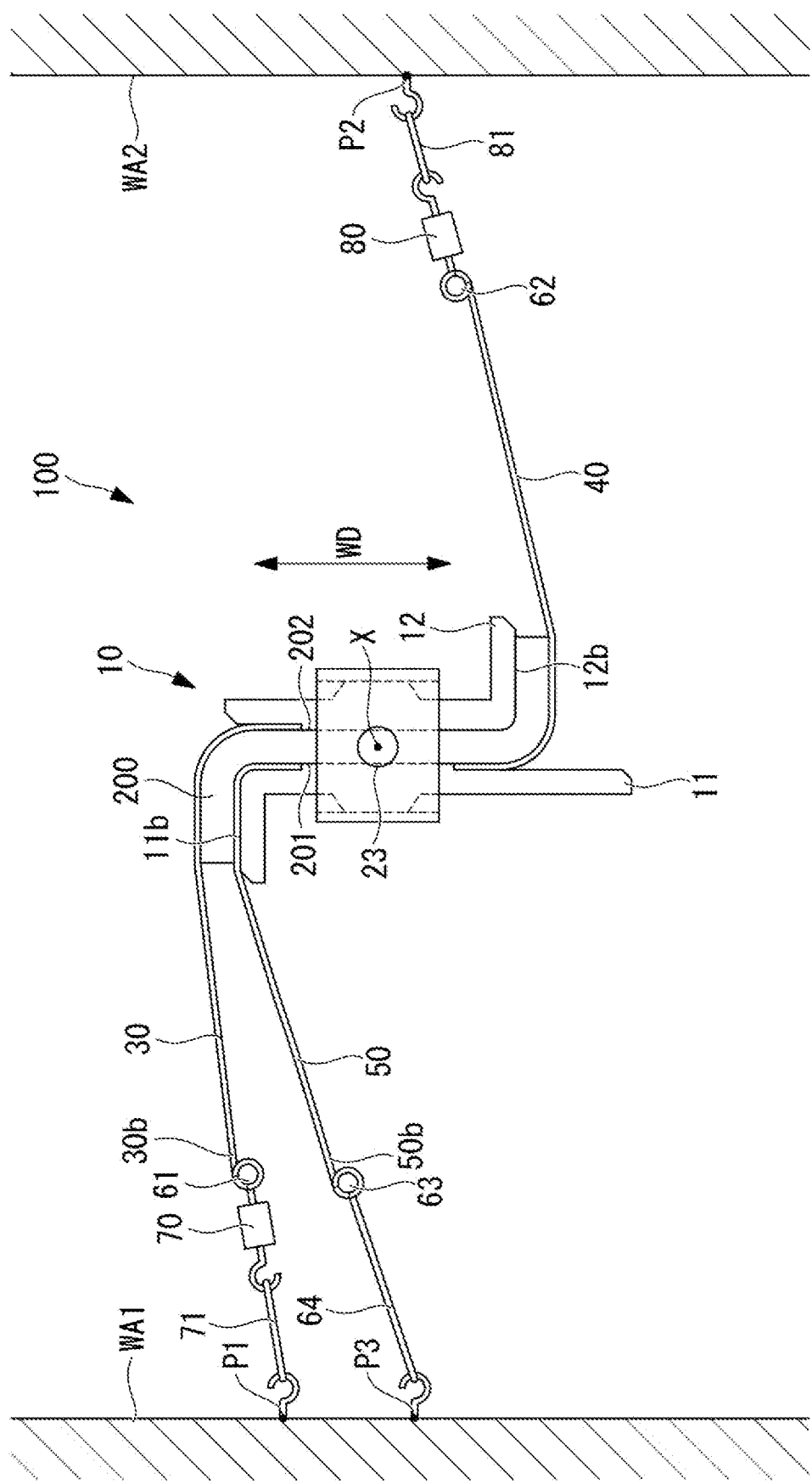
FIG. 3 is a front view illustrating the forming device according to the first embodiment of the disclosure and illustrates a state after the forming operation is performed.
Figure 4:
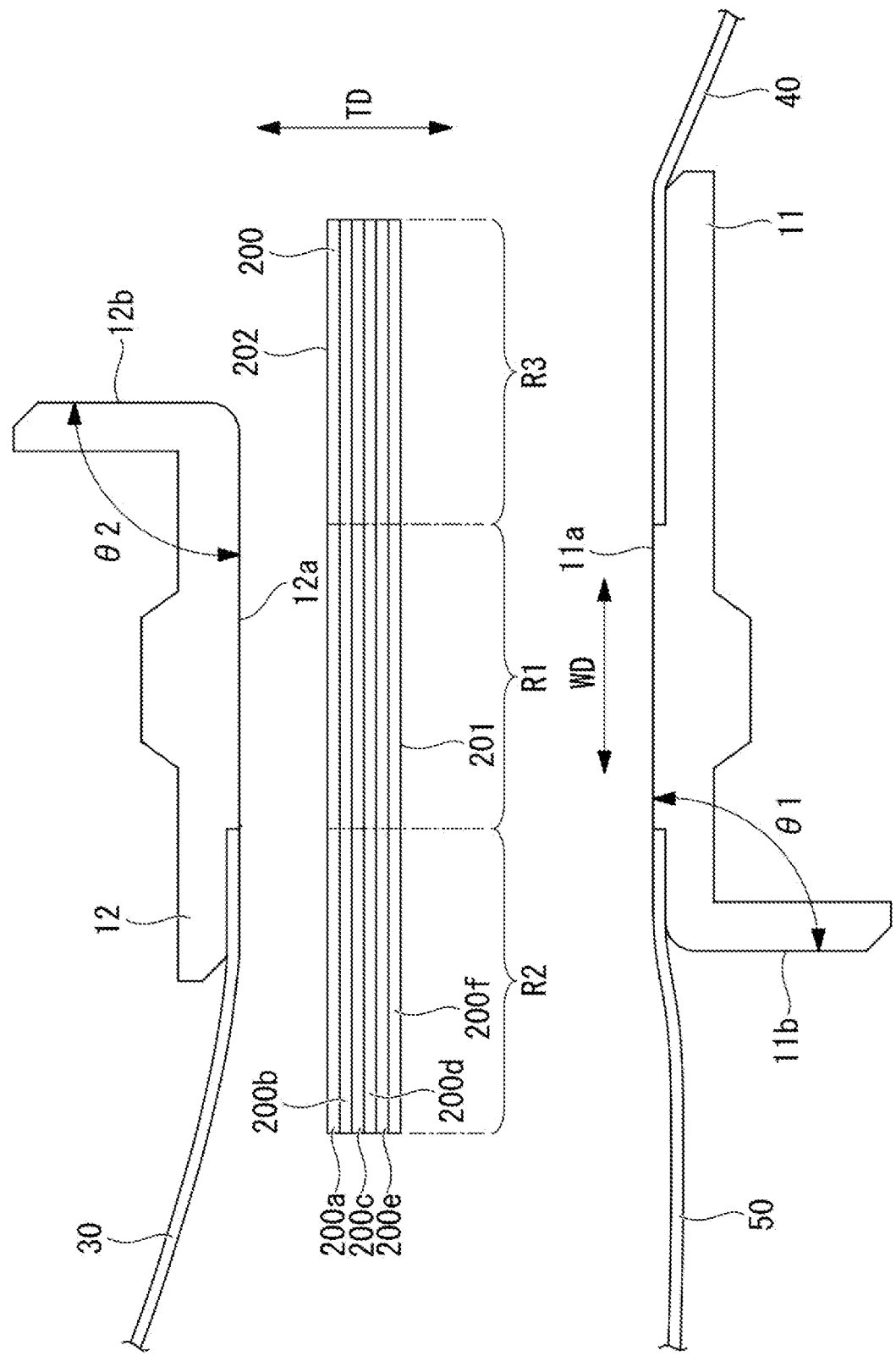
FIG. 4 is an exploded view of the forming device illustrated in FIG. 2.

A forming device 100 according to a first embodiment of the disclosure and a forming method using the same will be described below with reference to the drawings. FIG. 1 is a perspective view illustrating the forming device 100 according to the first embodiment of the disclosure and illustrates a state after a forming operation is performed. FIG. 2 is a front view illustrating the forming device 100 according to the first embodiment of the disclosure and illustrates a state before the forming operation is performed. FIG. 3 is a front view illustrating the forming device according to the first embodiment of the disclosure and illustrates a state after the forming operation is performed. FIG. 4 is an exploded view of the forming device illustrated in FIG. 2.

The forming device 100 according to the present embodiment is a device for forming a laminate 200 obtained by laminating a plurality of sheet materials containing reinforced fibers along a surface shape of a forming tool 10 for forming. The laminate 200 is obtained by laminating a plurality of layers of sheet-like composite materials. The composite material constituting the laminate 200 is a sheet-like intermediate molding material in which a matrix resin adheres to and is semi-integrated with reinforced fibers.

The reinforced fibers contained in the composite material are, for example, carbon fibers, glass fibers, or aramid fibers. As the matrix resin contained in the composite material, a thermosetting resin or a thermoplastic resin can be used. Examples of the thermosetting matrix resin include epoxy resin, unsaturated polyester, vinyl ester, phenol, cyanate ester, and polyimide.

Examples of the thermoplastic matrix resin include polyether ether ketone (PEEK), polyethylene terephthalate (PET), polybutylene terephthalate (PBT), nylon 6 (PA6), nylon 66 (PA66), polyphenylene sulfide (PPS), polyether imide (PEI), and polyether ketone (PEKK).

The forming tool 10 is provided with a heating mechanism (not illustrated) capable of heating the matrix resin to a softening temperature or higher. The heating mechanism heats the matrix resin to the softening temperature or higher, and thus the laminate 200 containing the matrix resin can be formed along the surface shape of the forming tool 10.

A plurality of sheet-like reinforced fibers (dry fabric) not containing a matrix resin may be laminated and then formed into a flat shape, and this flat laminate may be used as the laminate 200. In the case of using dry fabric, a resin transfer molding (RTM) method is used in which molding is performed by disposing the laminate 200 formed along the surface shape of the forming tool 10 in a mold (not illustrated), injecting a resin material into the mold, and impregnating the reinforced fibers with the resin material.

In addition, in the laminate 200 made of dry fabric, a powdery resin (powder binder) for temporarily fixing the adjacent dry fabrics is desirably sprayed on the surface of each of the plurality of layers of the dry fabrics. As the powder binder, a thermosetting resin or a thermoplastic resin can be used.

As illustrated in FIG. 1, the forming device 100 according to the present embodiment includes the forming tool 10, a rotation mechanism 20, a first forming sheet 30, a second forming sheet 40, a shape maintaining sheet 50, fixed bars 61, 62, and 63, a load cell (first detection unit) 70, a load cell 80, and a control device 90.

The forming tool 10 is a tool having a surface shape for forming the laminate 200 and is made of, for example, a metal material. As illustrated in FIG. 2, the forming tool 10 includes a first forming member 11 that comes into contact with a first surface 201 of the laminate 200, a second forming member 12 that comes into contact with a second surface 202 of the laminate 200, a maintaining member 13, and a maintaining member 14. The maintaining member 13 and the maintaining member 14 are members that maintains a state in which a first region R1 of the laminate 200 is sandwiched between the first forming member 11 and the second forming member 12 and disposed along the width direction (predetermined direction).

As illustrated in FIG. 4, the laminate 200 includes the first region R1 in a central portion in a width direction WD, a second region R2 adjacent to the first region R1 on an end side in the width direction WD, and a third region R3 adjacent to the first region R1 on an end side in the width direction WD. The laminate 200 is obtained by laminating six reinforced fiber sheets 200a, 200b, 200c, 200d, 200e, and 200f in a thickness direction TD orthogonal to the width direction WD. The number of the reinforced fiber sheets constituting the laminate 200 may be a given number other than six.

As illustrated in FIG. 4, the first forming member 11 includes a first contact surface 11a extending along the width direction WD while coming into contact with the first region R1 of the laminate 200, and a first forming surface 11b inclined at a first predetermined angle θ1 with respect to the width direction WD. The first predetermined angle θ1 is set, for example, in a range of 45 degrees or more and 120 degrees or less.

As illustrated in FIG. 4, the second forming member 12 includes a second contact surface 12a extending along the width direction WD while coming into contact with the first region R1 of the laminate 200, and a second forming surface 12b inclined at a second predetermined angle θ2 with respect to the width direction WD. The second predetermined angle θ2 is set, for example, in a range of 45 degrees or more and 120 degrees or less.

The rotation mechanism 20 is a mechanism that rotates the forming tool 10 around a rotation axis X orthogonal to the width direction WD. As illustrated in FIG. 1, the rotation mechanism 20 includes a drive motor 21, a reduction device 22, a support shaft 23, a support stand 24, and a support stand 25. The support stand 24 and the support stand 25 are members disposed near both ends in a longitudinal direction LD in which the laminate 200 extends and support the maintaining member 13 and the maintaining member 14 of the forming tool 10 via the support shaft 23 such that the maintaining member 13 and the maintaining member 14 are rotatable around the rotation axis X. The drive motor 21 rotates the forming tool 10 around the rotation axis X via the reduction device 22 and the support shaft 23 coupled to the reduction device.

The rotation mechanism 20 performs a forming operation of rotating the forming tool 10 clockwise around the rotation axis X, thereby pressing, by the first forming sheet 30 in contact with the second surface 202 of the laminate 200, the first surface 201 of the laminate 200 against the first forming surface 11b to bend the laminate 200. Further, the rotation mechanism 20 performs a forming operation of rotating the forming tool 10 clockwise around the rotation axis X, thereby pressing, by the second forming sheet 40 in contact with the first surface 201 of the laminate 200, the second surface 202 of the laminate 200 against the second forming surface 12b to bend the laminate 200.

As illustrated in FIG. 2, in a state before the rotation mechanism 20 performs the forming operation, the maintaining member 13 maintains a state in which the first region R1 of the laminate 200 is sandwiched between the first forming member 11 and the second forming member 12 and disposed along the width direction WD. The first surface 201 of the second region R2 of the laminate 200 is held by the shape maintaining sheet 50 so as not to come into contact with the first forming surface 11b. The first surface 201 of the third region R3 of the laminate 200 is supported by the first forming member 11 via the second forming sheet 40. The rotation mechanism 20 rotates the forming tool 10 clockwise around the rotation axis X by about 90 degrees from the state illustrated in FIG. 2 and thus is brought into a state illustrated in FIG. 3.

As illustrated in FIG. 3, in a state after the rotation mechanism 20 performs the forming operation, a tension is applied from the first forming sheet 30 in contact with the second surface 202 to the second region R2 of the laminate 200, and the first surface 201 is pressed against the first forming surface 11b via the shape maintaining sheet 50. Similarly, a tension is applied to the third region R3 of the laminate 200 from the second forming sheet 40 in contact with the first surface 201, and the second surface 202 is pressed against the second forming surface 12b.

The first forming sheet 30 is a sheet for forming the second region R2 of the laminate 200. The first forming sheet 30 is made of, for example, an elastic rubber material stretchable along the width direction WD. One end 30a of the first forming sheet 30 is fixed to the second forming member 12 at a position facing the second region R2 of the laminate 200. Another end 30b of the first forming sheet 30 is fixed to a first predetermined position P1 of a first wall portion WA1 via the fixed bar 61, a load cell 70, and a coupling cable 71.

The second forming sheet 40 is a sheet for forming the third region R3 of the laminate 200. The second forming sheet 40 is made of, for example, an elastic rubber material stretchable along the width direction WD. One end 40a of the second forming sheet 40 is fixed to the first forming member 11 at a position facing the third region R3 of the laminate 200. Another end 40b of the second forming sheet 40 is fixed to a second predetermined position P2 of a second wall portion WA2 via the fixed bar 62, the load cell 80, and a coupling cable 81.

The shape maintaining sheet 50 is a sheet for maintaining the shape of the second region R2 of the laminate 200. The shape maintaining sheet 50 is made of, for example, an elastic rubber material stretchable in the width direction WD. One end 50a of the shape maintaining sheet 50 is fixed to the first forming member 11 at a position facing the second region R2 of the laminate 200. Another end 50b of the shape maintaining sheet 50 is fixed to a third predetermined position P3 of the first wall portion WA1 via the fixed bar 63 and a coupling cable 64.

As illustrated in FIG. 2, before the rotation mechanism 20 performs the forming operation, the forming tool 10 holds the first region of the laminate 200 between the first forming member 11 and the second forming member 12 with the width direction WD aligned with the horizontal direction. The shape maintaining sheet 50 also holds the first surface 201 of the laminate 200 so that the second region R2 of the laminate 200 does not come into contact with the first forming surface 11b.

The fixed bar 61 is a shaft-like member attached to the other end 30b of the first forming sheet 30 and extending along the longitudinal direction LD. The fixed bar 61 is fixed to the first predetermined position P1 of the first wall portion WA1 via the load cell 70 and the coupling cable 71. The fixed bar 62 is a shaft-like member attached to the other end 40b of the second forming sheet 40 and extending along the longitudinal direction LD. The fixed bar 62 is fixed to the second predetermined position P2 of the second wall portion WA2 via the load cell 80 and the coupling cable 81. The fixed bar 63 is a shaft-like member attached to the other end 50b of the shape maintaining sheet 50 and extending in the longitudinal direction LD. The fixed bar 63 is fixed to the third predetermined position P3 of the first wall portion WA1 via the coupling cable 64.

The load cell (first detection unit) 70 is a device that detects a first tension applied to the first forming sheet 30 when the rotation mechanism 20 performs the forming operation. The control device 90 is notified of the first tension detected by the load cell 70.

The load cell (second detection unit) 80 is a device that detects a second tension applied to the second forming sheet 40 when the rotation mechanism 20 performs the forming operation. The control device 90 is notified of the second tension detected by the load cell 80.

The control device 90 is a device that controls each unit of the forming device 100 including the rotation mechanism 20. The control device 90 performs an operation of controlling each unit in accordance with a program stored in a storage unit (not illustrated).

Figure 5:
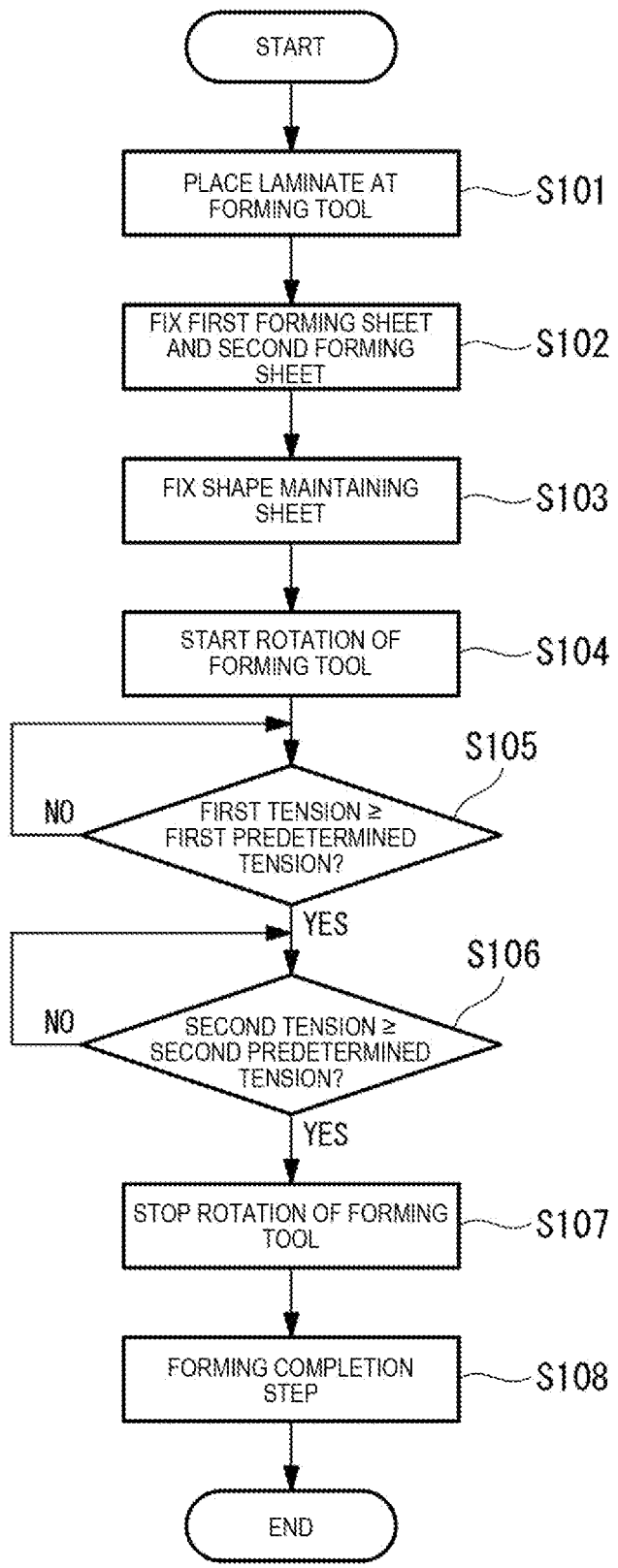
FIG. 5 is a flowchart of a forming method according to the first embodiment of the disclosure.

Next, a forming method performed by the forming device 100 according to the present embodiment will be described. FIG. 5 is a flowchart illustrating the forming method performed by the forming device 100 according to the first embodiment of the disclosure.

In step S101, the operator places the laminate 200 at the forming tool 10. The operator causes the first region R1 of the laminate 200 to be held between the first forming member 11 and the second forming member 12 with the width direction WD of the laminate 200 aligned with the horizontal direction. The operator attaches the maintaining members 13 to both end portions of the forming tool 10 in the longitudinal direction LD so as to maintain a state in which the laminate 200 is held between the first forming member 11 and the second forming member 12.

In step S102, the operator fixes the first forming sheet 30 and the second forming sheet 40 to the first predetermined position P1 and the second predetermined position P2, respectively. The operator fixes the other end 30b of the first forming sheet 30 to the first predetermined position P1 via the fixed bar 61, the load cell 70, and the coupling cable 71. Further, the operator fixes the other end 40b of the second forming sheet 40 to the second predetermined position P2 via the fixed bar 62, the load cell 80, and the coupling cable 81.

In step S103, the operator fixes the shape maintaining sheet 50 to the third predetermined position. The operator fixes the other end 50b of the shape maintaining sheet 50 to the third predetermined position P3 via the fixed bar 63 and the coupling cable 64. When steps S101 to S103 described above are performed, the forming device 100 is brought into the state illustrated in FIG. 2.

In step S104, the control device 90 controls the rotation mechanism 20 to start rotation of the forming tool 10. The control device 90 starts an operation of the drive motor 21 of the rotation mechanism 20 to start an operation of rotating the forming tool 10 clockwise around the rotation axis X.

In step S105, the control device 90 determines whether the first tension output from the load cell 70 is equal to or greater than a first predetermined tension. If YES, the processing proceeds to step S106. If NO, step S105 is performed again. The first predetermined tension is a tension set in advance so that the first forming sheet 30 can apply a load necessary for pressing the second region R2 of the laminate 200 against the first forming surface 11b of the first forming member 11.

In step S106, the control device 90 determines whether the second tension output from the load cell 80 is equal to or greater than a second predetermined tension. If YES, the processing proceeds to step S107. If NO, step S106 is performed again. The second predetermined tension is a tension set in advance so that the second forming sheet 40 can apply a load necessary for pressing the third region R3 of the laminate 200 against the second forming surface 12b of the second forming member 12.

In step S107, since the first tension output from the load cell 70 is equal to or greater than the first predetermined tension and the second tension output from the load cell 80 is equal to or greater than the second predetermined tension, the control device 90 controls the rotation mechanism 20 to stop the rotation of the forming tool 10. The rotation mechanism 20 stops the rotation of the forming tool 10 when the first tension detected by the load cell 70 reaches the first predetermined tension and the second tension detected by the load cell 80 reaches the second predetermined tension.

In step S108, a forming completion step is performed. The operator releases the state in which the other end 30b of the first forming sheet 30 is fixed to the first predetermined position P1, releases the state in which the other end 40b of the second forming sheet 40 is fixed to the second predetermined position P2, and releases the state in which the other end 50b of the shape maintaining sheet 50 is fixed to the third predetermined position P3. In addition, the operator removes, from the forming tool 10, the laminate 200 that has been subjected to the forming operation (the operation from step S104 to step S107) and that includes the bent first region R1 and the bent third region R3. With the above processes, the forming method performed by the forming device 100 is completed.

In the flowchart described above, the control device 90 controls the rotation mechanism 20 to stop the rotation of the forming tool 10 because the first tension output from the load cell 70 is equal to or greater than the first predetermined tension and the second tension output from the load cell 80 is equal to or greater than the second predetermined tension. However, the control device 90 may have another aspect. For example, when the first tension output from the load cell 70 is equal to or greater than the first predetermined tension, the control device 90 may control the rotation mechanism 20 to stop the rotation of the forming tool 10. That is, the control device 90 may control the rotation mechanism 20 to stop the rotation of the forming tool 10 with reference to only the first tension detected by the load cell 70. Furthermore, a modification example may be adopted in which the control device 90 controls the rotation mechanism 20 to stop the rotation of the forming tool 10 with reference to only the second tension detected by the load cell 80.

Actions and effects exhibited by the forming device 100 of the above-described present embodiment will be described.

According to the forming device 100 of the present embodiment, the maintaining member 13 maintains a state in which the first region R1 of the laminate 200 is sandwiched between the first forming member 11 and the second forming member 12 and disposed along the width direction WD. The rotation mechanism 20 performs the forming operation of rotating the forming tool 10 around the rotation axis X, thereby pressing, by the first forming sheet 30 in contact with the second surface 202 of the laminate 200, the first surface 201 of the laminate 200 against the first forming surface 11b to bend the laminate 200.

The one end 30a of the first forming sheet 30 is fixed to the second forming member 12 at a position facing the second region R2 adjacent to the first region R1, and the other end 30b is fixed to the first predetermined position P1. Thus, when the forming tool 10 is rotated around the rotation axis X by the rotation mechanism 20, the first forming sheet 30 is pressed against the second surface 202 of the laminate 200, and the first surface 201 of the laminate 200 is pressed against the first forming surface 11b of the first forming member 11. Since the first forming surface 11b is inclined at the first predetermined angle $\theta 1$ with respect to the width direction WD, the second region R2 of the laminate 200 is bent at the first predetermined angle $\theta 1$ by the forming operation. Thus, the laminate 200 can be faithfully bent along the shape of the forming tool 10.

According to the forming device 100 of the present embodiment, the rotation mechanism 20 performs the forming operation of rotating the forming tool 10 around the rotation axis X, thereby pressing, by the second forming sheet 40 in contact with the first surface 201 of the laminate 200, the second surface 202 of the laminate 200 against the second forming surface 12b to bend the laminate 200.

The one end 40a of the second forming sheet 40 is fixed to the first forming member 11 at a position facing the third region R3 adjacent to the first region R1, and the other end 40b is fixed to the second predetermined position P2. Thus, when the forming tool 10 is rotated around the rotation axis X by the rotation mechanism 20, the second forming sheet 40 is pressed against the first surface 201 of the laminate 200, and the second surface 202 of the laminate 200 is pressed against the second forming surface 12b of the second forming member 12. Since the second forming surface 12b is inclined at the second predetermined angle $\theta 2$ with respect to the width direction WD, the third region R3 of the laminate 200 is bent at the second predetermined angle $\theta 2$ by the forming operation.

According to the forming device 100 of the present embodiment, before the rotation mechanism 20 performs the forming operation, the forming tool 10 holds the first region R1 of the laminate 200 between the first forming member 11 and the second forming member 12 with the width direction WD aligned with the horizontal direction. Since the first region R1 of the laminate 200 is held in the horizontal direction, the second region R2 adjacent to the first region R1 is subjected to downward gravity. Thus, the shape maintaining sheet 50 holds the first surface 201 of the laminate 200 so as not to come into contact with the first forming surface 11b, which can appropriately prevent the second region R2 of the laminate 200 from being deformed by the weight.

According to the forming device 100 of the present embodiment, the rotation of the forming tool 10 is stopped when the first tension applied to the first forming sheet 30 reaches the first predetermined tension, and thus it is possible to appropriately maintain a state in which the first forming sheet 30 applies the first predetermined tension to the laminate 200.

Second Embodiment

Next, a forming device 100A according to a second embodiment of the disclosure will be described with reference to the drawings. The present embodiment is a modification example of the first embodiment. Unless otherwise described below, the present embodiment is the same as the first embodiment, and description thereof will be omitted below.

The forming device 100 according to the first embodiment performs the forming operation of fixing the other end 30b of the first forming sheet 30 and the other end 40b of the second forming sheet 40 and rotating the forming tool 10 holding the laminate 200 around the rotation axis X, thereby bending the second region R2 and the third region R3 of the laminate 200 with respect to the first region R1.

On the other hand, the forming device 100A according to the present embodiment performs a forming operation of not rotating and fixing the forming tool 10 holding the laminate 200 and moving the other end 30b of the first forming sheet 30 and the other end 40b of the second forming sheet 40 around the rotation axis X by a movement mechanism 20A, thereby bending the second region R2 and the third region R3 of the laminate 200 with respect to the first region R1.

Figure 6:
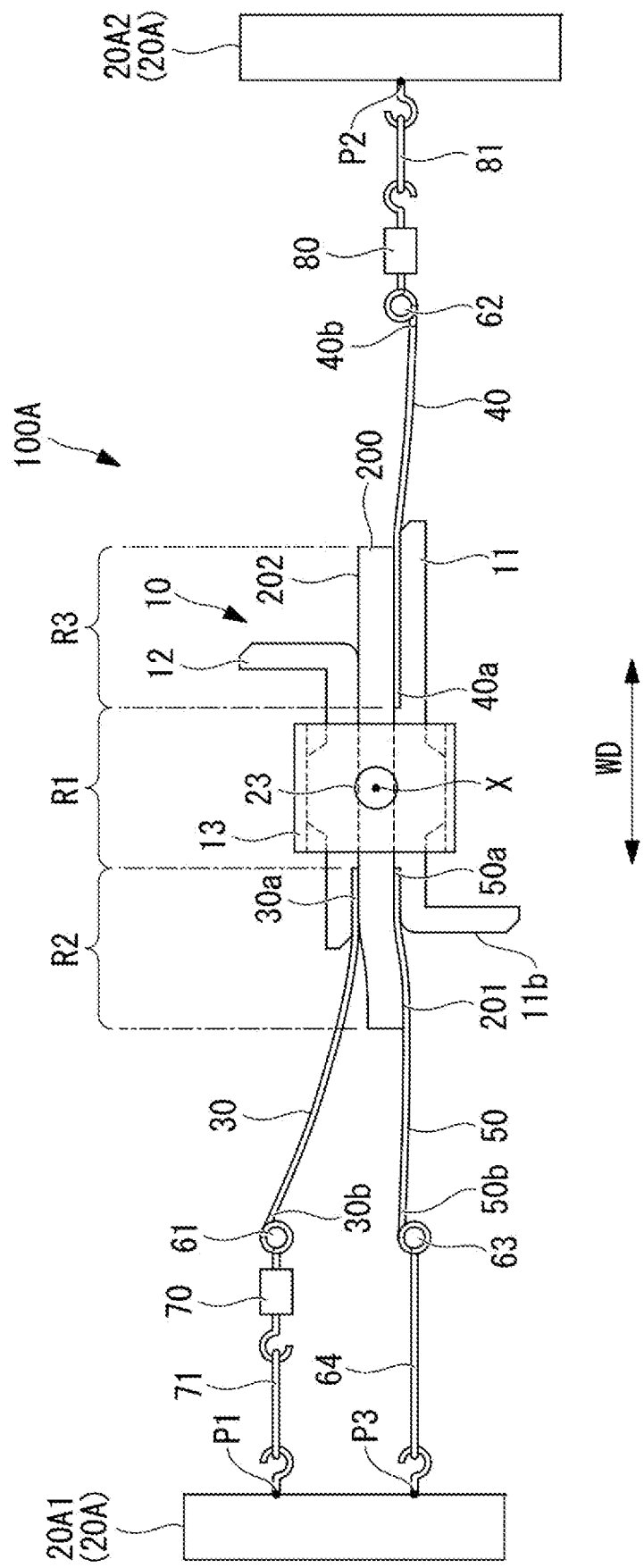
FIG. 6 is a front view illustrating a forming device according to a second embodiment of the disclosure and illustrates a state before a forming operation is performed.
Figure 7:
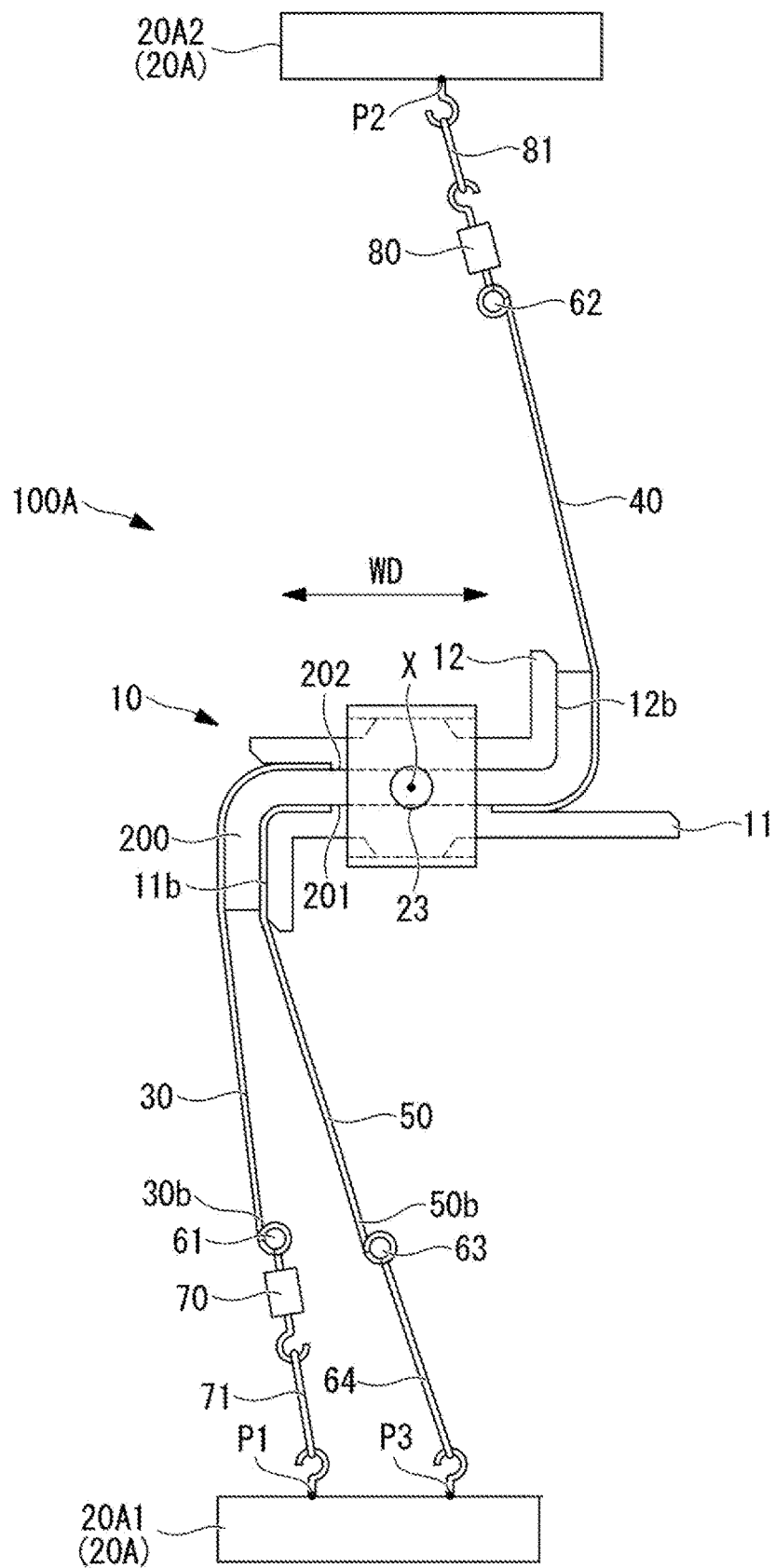
FIG. 7 is a front view illustrating the forming device according to the second embodiment of the disclosure and illustrates a state after the forming operation is performed.

FIG. 6 is a front view illustrating the forming device 100A according to the second embodiment of the disclosure and illustrates a state before the forming operation is performed. FIG. 7 is a front view illustrating the forming device 100A according to the second embodiment of the disclosure and illustrates a state after the forming operation is performed.

The movement mechanism 20A is a mechanism including a first movement unit 20A1 that moves the other end 30b of the first forming sheet 30 and a second movement unit 20A2 that moves the other end 40b of the second forming sheet 40.

The first movement unit 20A1 performs a forming operation of moving the other end 30b of the first forming sheet 30 counterclockwise around the rotation axis X, thereby pressing, by the first forming sheet 30 in contact with the second surface 202 of the laminate 200, the first surface 201 of the laminate 200 against the first forming surface 11b to bend the laminate 200. The second movement unit 20A2 performs a forming operation of moving the other end 40b of the second forming sheet 40 counterclockwise around the rotation axis X, thereby pressing, by the second forming sheet 40 in contact with the first surface 201 of the laminate 200, the second surface 202 of the laminate 200 against the second forming surface 12b to bend the laminate 200.

As illustrated in FIG. 6, in a state before the movement mechanism 20A performs the forming operation, the maintaining member 13 maintains a state in which the first region R1 of the laminate 200 is sandwiched between the first forming member 11 and the second forming member 12 and disposed along the width direction WD. The first surface 201 of the second region R2 of the laminate 200 is held by the shape maintaining sheet 50 so as not to come into contact with the first forming surface 11b. The first surface 201 of the third region R3 of the laminate 200 is supported by the first forming member 11 via the second forming sheet 40. The movement mechanism 20A moves the other end 30b of the first forming sheet 30 and the other end 40b of the second forming sheet 40 counterclockwise around the rotation axis X by about 90 degrees from the state illustrated in FIG. 6 and thus is brought into the state illustrated in FIG. 7.

As illustrated in FIG. 7, in a state after the movement mechanism 20A performs the forming operation, a tension is applied to the second region R2 of the laminate 200 from the first forming sheet 30 in contact with the second surface 202, and the first surface 201 is pressed against the first forming surface 11b via the shape maintaining sheet 50. Similarly, a tension is applied to the third region R3 of the laminate 200 from the second forming sheet 40 in contact with the first surface 201, and the second surface 202 is pressed against the second forming surface 12b.

According to the forming device 100A of the present embodiment, the maintaining member 13 maintains a state in which the first region R1 of the laminate 200 is sandwiched between the first forming member 11 and the second forming member 12 and disposed along the width direction WD. The movement mechanism 20A performs a forming operation of moving the other end 30b of the first forming sheet 30 in contact with the second surface 202 of the laminate 200, thereby pressing, by the first forming sheet 30 in contact with the second surface 202 of the laminate 200, the first surface 201 of the laminate 200 against the first forming surface 11b to bend the laminate 200.

The one end 30a of the first forming sheet 30 is fixed to the second forming member 12 at a position facing the second region R2 adjacent to the first region R1 of the laminate 200. Thus, when the other end 30b of the first forming sheet 30 is moved by the movement mechanism 20A, the first forming sheet 30 is pressed against the second surface 202 of the laminate 200, and the first surface 201 of the laminate 200 is pressed against the first forming surface 11b of the first forming member 11. Since the first forming surface 11b is inclined at the first predetermined angle θ1 with respect to the width direction WD, the second region R2 of the laminate 200 is bent at the first predetermined angle θ1 by the forming operation. Thus, the laminate 200 can be faithfully bent along the shape of the forming tool 10.

The movement mechanism 20A performs a forming operation of moving the other end 40b of the second forming sheet 40 in contact with the first surface 201 of the laminate 200, thereby pressing, by the second forming sheet 40 in contact with the first surface 201 of the laminate 200, the second surface 202 of the laminate 200 against the second forming surface 12b to bend the laminate 200.

The one end 40a of the second forming sheet 40 is fixed to the first forming member 11 at a position facing the third region R3 adjacent to the first region R1 of the laminate 200. Thus, when the other end 40b of the second forming sheet 40 is moved by the movement mechanism 20A, the second forming sheet 40 is pressed against the first surface 201 of the laminate 200, and the second surface 202 of the laminate 200 is pressed against the second forming surface 12b of the second forming member 12. Since the second forming surface 12b is inclined at the second predetermined angle θ2 with respect to the width direction WD, the third region R3 of the laminate 200 is bent at the second predetermined angle θ2 by the forming operation. Thus, the laminate 200 can be faithfully bent along the shape of the forming tool 10.

Third Embodiment

Next, a forming device 100B according to a third embodiment of the disclosure will be described with reference to the drawings. The present embodiment is a modification example of the first embodiment. Unless otherwise described below, the present embodiment is the same as the first embodiment, and description thereof will be omitted below.

The forming device 100 according to the first embodiment includes the load cell 70 that detects the first tension applied to the first forming sheet 30 and the load cell 80 that detects the second tension applied to the second forming sheet 40. The forming device 100 according to the first embodiment controls the rotation mechanism 20 to stop the rotation of the forming tool 10 when the first tension output from the load cell 70 is equal to or greater than the first predetermined tension and the second tension output from the load cell 80 is equal to or greater than the second predetermined tension.

On the other hand, the forming device 100B according to the present embodiment includes neither the load cell 70 nor the load cell 80. The forming device 100B according to the present embodiment controls the rotation mechanism 20 to stop the rotation of the forming tool 10 when a rotation angle $\theta 3$ around the rotation axis X of the forming tool 10 from the state where the laminate 200 is placed at the forming tool 10 is equal to or greater than a predetermined stop angle.

Figure 8:
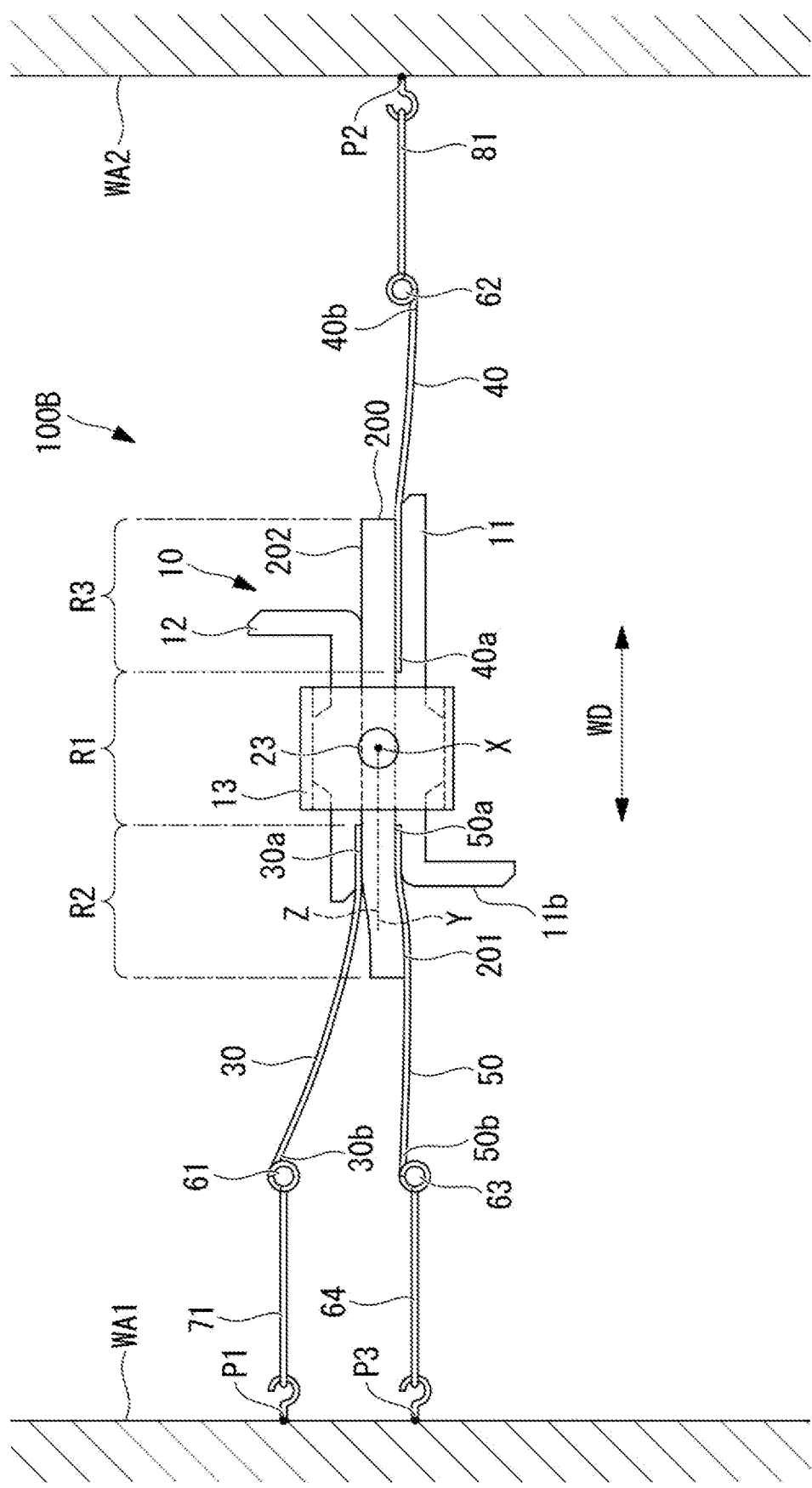
FIG. 8 is a front view illustrating a forming device according to a third embodiment of the disclosure and illustrates a state before a forming operation is performed.
Figure 9:
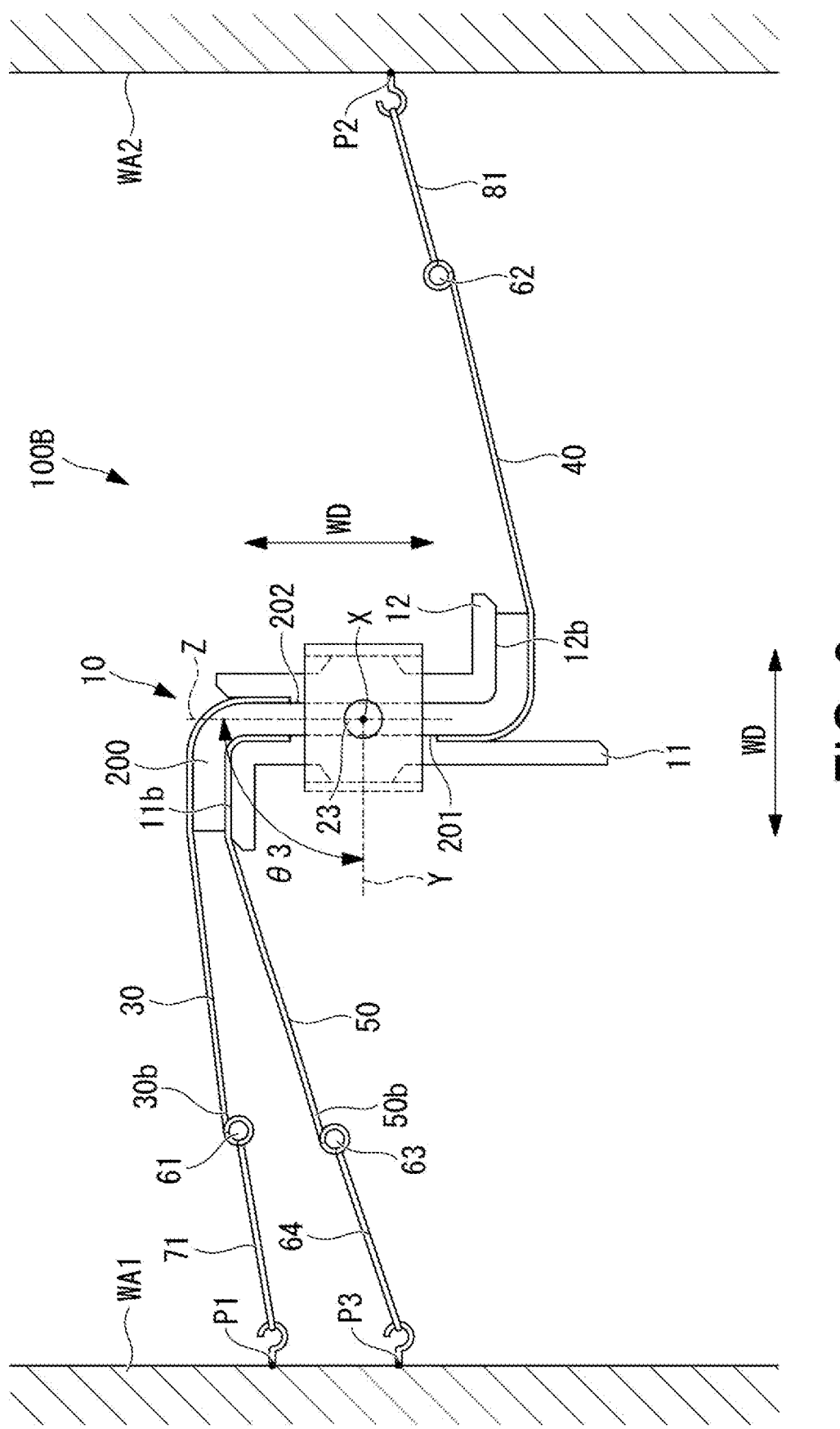
FIG. 9 is a front view illustrating the forming device according to the third embodiment of the disclosure and illustrates a state after the forming operation is performed.

FIG. 8 is a front view illustrating the forming device 100B according to the third embodiment of the disclosure and illustrates a state before a forming operation is performed. FIG. 9 is a front view illustrating the forming device 100B according to the third embodiment of the disclosure and illustrates a state after the forming operation is performed.

The forming device 100B according to the present embodiment is the same as the forming device 100 according to the first embodiment except that the load cell 70 and the load cell 80 are not provided. In FIGS. 8 and 9, an axis Y is an axis parallel to the width direction WD. An axis Z is an axis along a direction in which the flat first region R1 of the laminate 200 extends. As illustrated in FIG. 8, the axis Z around the rotation axis X is aligned with the axis Y in a state before the forming operation is performed.

On the other hand, as illustrated in FIG. 9, the axis Z is disposed apart from the axis Y by the rotation angle $\theta 3$ in the rotation direction around the rotation axis X in a state after the forming operation is performed. The forming device 100B according to the present embodiment adjusts the rotation angle $\theta 3$ after performing the forming operation so that the first tension applied to the first forming sheet 30 and the second tension applied to the second forming sheet 40 have desired values.

Figure 10:
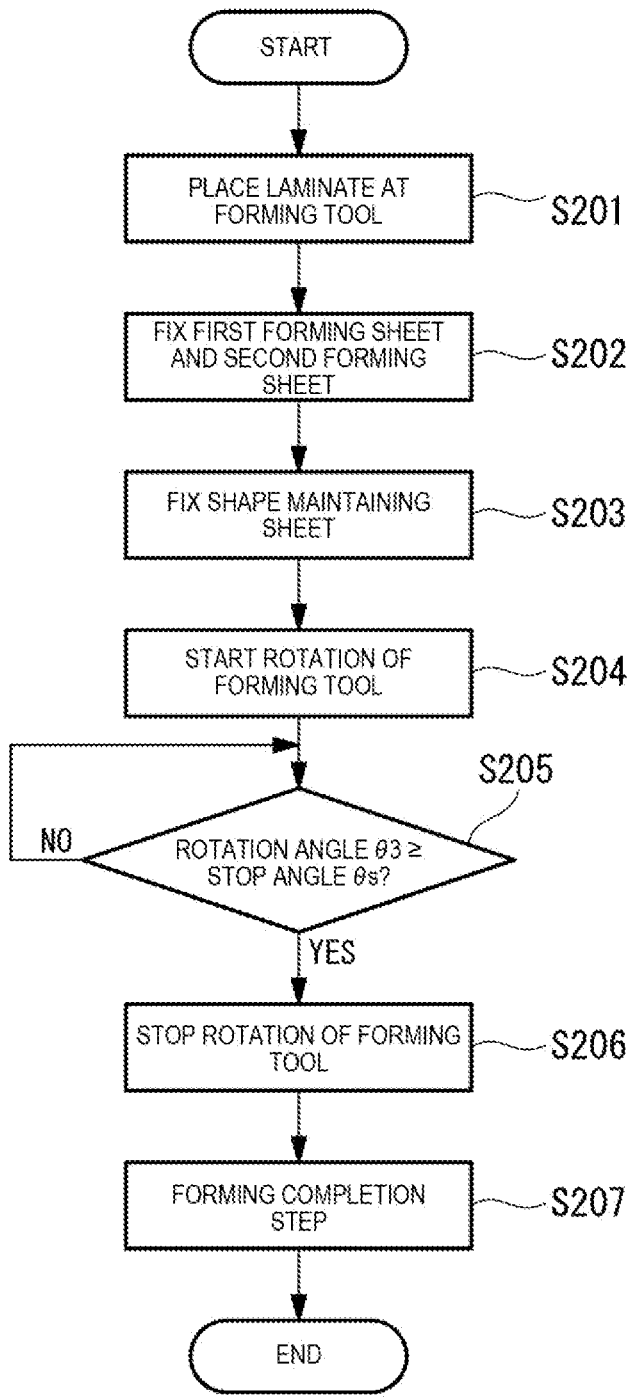
FIG. 10 is a flowchart of a forming method according to a third embodiment of the disclosure.

Next, a forming method performed by the forming device 100B according to the present embodiment will be described. FIG. 10 is a flowchart illustrating the forming method performed by the forming device 100B according to the third embodiment of the disclosure. Steps S201 to S204 and S206 to S207 of the flowchart illustrated in FIG. 10 are the same as steps S101 to S104 and S107 to S108 of the flowchart of the first embodiment illustrated in FIG. 5, and thus description thereof will be omitted below.

In step S205, the control device 90 determines whether the rotation angle $\theta 3$ of the axis Z around the rotation axis X with respect to the axis Y is equal to or greater than a predetermined stop angle $\theta s$. If YES, the processing proceeds to step S206. If NO, the determination in step S205 is repeated. The predetermined stop angle $\theta s$ is set to an angle at which the first predetermined tension or more is applied to the first forming sheet 30 and the second predetermined tension or more is applied to the second forming sheet 40. The predetermined stop angle $\theta s$ is set in a range of, for example, 45 degrees or more and 120 degrees or less.

The predetermined stop angle $\theta s$ may be set to a constant numerical value that does not change, but may have another aspect. For example, the predetermined stop angle $\theta s$ may be set to increase according to the number of times the forming operation using the first forming sheet 30 and the second forming sheet 40 is performed. Since the first forming sheet 30 and the second forming sheet 40 are made of a rubber material, the elastic force decreases due to a load repeated with an increase in the number of times the forming operation is performed. By increasing the predetermined stop angle $\theta s$ with an increase in the number of times the forming operation is performed, even when the elastic forces of the first forming sheet 30 and the second forming sheet 40 decrease, it is possible to maintain a state in which the first predetermined tension or more is applied to the first forming sheet 30 and the second predetermined tension or more is applied to the second forming sheet 40 after the forming operation is performed.

Here, the first predetermined tension is a tension set in advance so that the first forming sheet 30 can apply a load necessary for pressing the second region R2 of the laminate 200 against the first forming surface 11b of the first forming member 11. The second predetermined tension is a tension set in advance so that the second forming sheet 40 can apply a load necessary for pressing the third region R3 of the laminate 200 against the second forming surface 12b of the second forming member 12.

In step S205, for example, the control device 90 detects the rotation angle $\theta 3$ based on a signal output from an angle detection mechanism (not illustrated) provided in the rotation mechanism 20. In addition, the control device 90 may detect the rotation angle $\theta 3$ based on an elapsed time from when the forming tool 10 starts rotating in step S204, the number of pulses of a drive signal transmitted to the rotation mechanism 20, or the like.

In step S206, since the rotation angle $\theta 3$ of the forming tool 10 around the rotation axis X is equal to or greater than the predetermined stop angle $\theta s$, the control device 90 controls the rotation mechanism 20 to stop the rotation of the forming tool 10. The rotation mechanism 20 stops the rotation of the forming tool 10 when the rotation angle $\theta 3$ around the rotation axis X of the forming tool 10 reaches the predetermined stop angle $\theta s$.

According to the forming device 100B of the present embodiment, the rotation of the forming tool 10 is stopped when the rotation angle $\theta 3$ around the rotation axis X of the forming tool 10 reaches the predetermined stop angle $\theta s$, and thus it is possible to appropriately maintain a state in which the first forming sheet 30 applies a desired load to the second region R2 of the laminate 200 and the second forming sheet 40 applies a desired load to the third region R3 of the laminate 200.

The forming device and the forming method described in the above-described embodiments can be understood, for example, as follows.

A forming device according to a first aspect of the disclosure is a forming device (100) for forming a laminate (200) in which a plurality of sheet materials containing reinforced fibers are laminated, the forming device including a forming tool (10) including a first forming member (11) configured to come into contact with a first surface (201) of the laminate, a second forming member (12) configured to come into contact with a second surface (202) of the laminate, and a maintaining member (13) configured to maintain a state in which the laminate is sandwiched between the first forming member and the second forming member and a first region (R1) of the laminate is disposed along a predetermined direction (WD), a rotation mechanism (20) configured to rotate the forming tool around a rotation axis (X) orthogonal to the predetermined direction, and a first forming sheet (30) including one end fixed to the second forming member at a position facing a second region (R2) adjacent to the first region, and another end fixed to a first predetermined position, wherein the first forming member includes a first contact surface (11a) extending along the predetermined direction while coming into contact with the first region of the laminate, and a first forming surface (11b) inclined at a first predetermined angle ($\theta 1$) with respect to the predetermined direction, and the rotation mechanism performs a forming operation of rotating the forming tool around the rotation axis, thereby pressing, by the first forming sheet in contact with the second surface of the laminate, the first surface of the laminate against the first forming surface to bend the laminate.

According to the forming device of the first aspect of the disclosure, the maintaining member maintains the state in which the first region of the laminate in which the plurality of sheet materials containing the reinforced fibers are laminated is sandwiched between the first forming member and the second forming member and disposed along the predetermined direction. The rotation mechanism performs the forming operation of rotating the forming tool around the rotation axis, thereby pressing, by the first forming sheet in contact with the second surface of the laminate, the first surface of the laminate against the first forming surface to bend the laminate.

The first forming sheet includes the one end fixed to the second forming member at the position facing the second region adjacent to the first region, and the other end fixed to the first predetermined position. Thus, when the forming tool is rotated around the rotation axis by the rotation mechanism, the first forming sheet is pressed against the second surface of the laminate, and the first surface of the laminate is pressed against the first forming surface of the first forming member. Since the first forming surface is inclined at the first predetermined angle with respect to the predetermined direction, the second region of the laminate is bent at the first predetermined angle by the forming operation. Thus, it is possible to provide the forming device capable of faithfully bending the laminate along the shape of the forming tool.

A forming device according to a second aspect of the disclosure further includes the following configuration in the first aspect. That is, the forming device includes a second forming sheet (40) including one end fixed to the first forming member at a position facing a third region adjacent to the first region, and another end fixed to a second predetermined position, wherein the second forming member includes a second contact surface (12a) extending along the predetermined direction while coming into contact with the first region of the laminate, and a second forming surface (12b) inclined at a second predetermined angle ($\theta 2$) with respect to the predetermined direction, and the rotation mechanism performs the forming operation of rotating the forming tool around the rotation axis, thereby pressing, by the second forming sheet in contact with the first surface of the laminate, the second surface of the laminate against the second forming surface to bend the laminate.

According to the forming device of the second aspect of the disclosure, the rotation mechanism performs the forming operation of rotating the forming tool around the rotation axis, thereby pressing, by the second forming sheet in contact with the first surface of the laminate, the second surface of the laminate against the second forming surface to bend the laminate.

The second forming sheet includes the one end fixed to the first forming member at the position facing the third region adjacent to the first region, and the other end fixed to the second predetermined position. Thus, when the forming tool is rotated around the rotation axis by the rotation mechanism, the second forming sheet is pressed against the first surface of the laminate, and the second surface of the laminate is pressed against the second forming surface of the second forming member. Since the second forming surface is inclined at the second predetermined angle with respect to the predetermined direction, the third region of the laminate is bent at the second predetermined angle by the forming operation.

A forming device according to a third aspect of the disclosure is the forming device according to the first or second aspect including a shape maintaining sheet (50) including one end fixed to the first forming member at a position facing the second region, and another end fixed to a third predetermined position, wherein, before the rotation mechanism performs the forming operation, the forming tool holds the first region of the laminate between the first forming member and the second forming member with the predetermined direction aligned with a horizontal direction, and the shape maintaining sheet holds the first surface of the laminate such that the second region of the laminate does not come into contact with the first forming surface.

According to the forming device of the third aspect of the disclosure, before the rotation mechanism performs the forming operation, the forming tool holds the first region of the laminate between the first forming member and the second forming member with the predetermined direction aligned with the horizontal direction. Since the first region of the laminate is held in the horizontal direction, the second region adjacent to the first region is subjected to downward gravity. Thus, the shape maintaining sheet holds the first surface of the laminate so as not to come into contact with the first forming surface, which can appropriately prevent the second region of the laminate from being deformed by the weight.

A forming device according to a fourth aspect of the disclosure is the forming device according to the first or second aspect including a first detection unit (70) configured to detect a first tension applied to the first forming sheet when the rotation mechanism performs the forming operation, wherein the rotation mechanism stops rotation of the forming tool when the first tension detected by the first detection unit reaches a first predetermined tension.

According to the forming device of the fourth aspect of the disclosure, the rotation of the forming tool is stopped when the first tension applied to the first forming sheet reaches the first predetermined tension. Thus, it is possible to appropriately maintain a state in which the first forming sheet applies the first predetermined tension to the laminate.

A forming device according to a fifth aspect of the disclosure is the forming device according to the second aspect including a first detection unit configured to detect a first tension applied to the first forming sheet when the rotation mechanism performs the forming operation, and a second detection unit configured to detect a second tension applied to the second forming sheet when the rotation mechanism performs the forming operation, wherein the rotation mechanism stops rotation of the forming tool when the first tension detected by the first detection unit reaches a first predetermined tension and the second tension detected by the second detection unit reaches a second predetermined tension.

According to the forming device of the fifth aspect of the disclosure, the rotation of the forming tool is stopped when the first tension applied to the first forming sheet reaches the first predetermined tension and the second tension applied to the second forming sheet reaches the second predetermined tension. Thus, it is possible to appropriately maintain a state in which the first forming sheet applies the first predetermined tension to the laminate and the second forming sheet applies the second predetermined tension to the laminate.

A forming device according to a sixth aspect of the disclosure is the forming device according to the first or second aspect, wherein the rotation mechanism stops rotation of the forming tool when a rotation angle of the forming tool around the rotation axis reaches a predetermined stop angle.

According to the forming device of the sixth aspect of the disclosure, the rotation of the forming tool is stopped when the rotation angle of the forming tool around the rotation axis reaches the predetermined stop angle. Thus, it is possible to appropriately maintain a state in which the first forming sheet applies a desired load to the laminate.

A forming device according to a seventh aspect of the disclosure is a forming device for forming a laminate in which a plurality of sheet materials containing reinforced fibers are laminated, the forming device including a forming tool including a first forming member configured to come into contact with a first surface of the laminate, a second forming member configured to come into contact with a second surface of the laminate, and a maintaining member configured to maintain a state in which a first region of the laminate is sandwiched between the first forming member and the second forming member and disposed along a predetermined direction, a first forming sheet including one end fixed to the second forming member at a position facing a second region adjacent to the first region, and a movement mechanism (20A) configured to move another end of the first forming sheet, wherein the first forming member includes a first contact surface extending along the predetermined direction while coming into contact with the first region of the laminate, and a first forming surface inclined at a first predetermined angle (01) with respect to the predetermined direction, and the movement mechanism performs a forming operation of moving the another end of the first forming sheet in contact with the second surface of the laminate, thereby pressing the first surface of the laminate against the first forming surface to bend the laminate.

According to the forming device of the seventh aspect of the disclosure, the maintaining member maintains the state in which the first region of the laminate in which the plurality of sheet materials containing the reinforced fibers are laminated is sandwiched between the first forming member and the second forming member and disposed along the predetermined direction. The movement mechanism performs the forming operation of moving the other end of the first forming sheet in contact with the second surface of the laminate, thereby pressing, by the first forming sheet in contact with the second surface of the laminate, the first surface of the laminate against the first forming surface to bend the laminate.

The first forming sheet includes the one end fixed to the second forming member at the position facing the second region adjacent to the first region of the laminate. Thus, when the other end of the first forming sheet is moved by the movement mechanism, the first forming sheet is pressed against the second surface of the laminate, and the first surface of the laminate is pressed against the first forming surface of the first forming member. Since the first forming surface is inclined at the first predetermined angle with respect to the predetermined direction, the second region of the laminate is bent at the first predetermined angle by the forming operation. Thus, it is possible to provide the forming device capable of faithfully bending the laminate along the shape of the forming tool.

A forming method according to an eighth aspect of the disclosure is a forming method for forming, by a forming device, a laminate in which a plurality of sheet materials containing reinforced fibers are laminated, wherein the forming device includes a forming tool including a first forming member configured to come into contact with a first surface of the laminate, a second forming member configured to come into contact with a second surface of the laminate, and a maintaining member configured to maintain a state in which a first region of the laminate is sandwiched between the first forming member and the second forming member and disposed along a predetermined direction, and a first forming sheet including one end fixed to the second forming member at a position facing a second region adjacent to the first region, and another end fixed to a first predetermined position, the first forming member includes a first contact surface extending along the predetermined direction while coming into contact with the first region of the laminate, and a first forming surface inclined at a first predetermined angle with respect to the predetermined direction, and the forming method includes forming the laminate, the forming including performing a forming operation of rotating the forming tool around a rotation axis orthogonal to the predetermined direction, thereby pressing, by the first forming sheet in contact with the second surface of the laminate, the first surface of the laminate against the first forming surface to bend the laminate.

According to the forming method of the eighth aspect of the disclosure, the maintaining member maintains the state in which the first region of the laminate in which the plurality of sheet materials containing the reinforced fibers are laminated is sandwiched between the first forming member and the second forming member and disposed along the predetermined direction. The forming includes performing the forming operation of rotating the forming tool around the rotation axis, thereby pressing, by the first forming sheet in contact with the second surface of the laminate, the first surface of the laminate against the first forming surface to bend the laminate.

The first forming sheet includes the one end fixed to the second forming member at the position facing the second region adjacent to the first region of the laminate, and the other end fixed to the first predetermined position. Thus, when the forming tool is rotated around the rotation axis by the rotation mechanism, the first forming sheet is pressed against the second surface of the laminate, and the first surface of the laminate is pressed against the first forming surface of the first forming member. Since the first forming surface is inclined at the first predetermined angle with respect to the predetermined direction, the second region of the laminate is bent at the first predetermined angle by the forming operation. Thus, it is possible to provide the forming method capable of faithfully bending the laminate along the shape of the forming tool.

A forming method according to a ninth aspect of the disclosure further includes the following configuration in the eighth aspect. That is, the forming device includes a second forming sheet including one end fixed to the first forming member at a position facing a third region adjacent to the first region, and another end fixed to a second predetermined position, the second forming member includes a second contact surface extending along the predetermined direction while coming into contact with the first region of the laminate, and a second forming surface inclined at a second predetermined angle with respect to the predetermined direction, and the forming includes performing the forming operation of rotating the forming tool around the rotation axis, thereby pressing, by the second forming sheet in contact with the first surface of the laminate, the second surface of the laminate against the second forming surface to bend the laminate.

According to the forming method of the ninth aspect of the disclosure, the forming includes performing the forming operation of rotating the forming tool around the rotation axis, thereby pressing, by the second forming sheet in contact with the first surface of the laminate, the second surface of the laminate against the second forming surface to bend the laminate.

The second forming sheet includes the one end fixed to the first forming member at the position facing the third region adjacent to the first region of the laminate, and the other end fixed to the second predetermined position. Thus, when the forming tool is rotated around the rotation axis by the rotation mechanism, the second forming sheet is pressed against the first surface of the laminate, and the second surface of the laminate is pressed against the second forming surface of the second forming member. Since the second forming surface is inclined at the second predetermined angle with respect to the predetermined direction, the third region of the laminate is bent at the second predetermined angle by the forming operation.

A forming method according to a tenth aspect of the disclosure further includes the following configuration in the eighth or ninth aspect. That is, the forming device includes a shape maintaining sheet (50) including one end fixed to the first surface in the second region, and another end fixed to a third predetermined position, the forming method includes holding, by the forming tool, the laminate between the first forming member and the second forming member with the predetermined direction aligned with a horizontal direction before the forming operation is performed in the forming, and the holding includes holding, by the shape maintaining sheet, the first surface of the laminate such that the second region of the laminate does not come into contact with the first forming surface.

According to the forming method of the tenth aspect of the disclosure, the holding includes holding, by the forming tool, the first region of the laminate between the first forming member and the second forming member with the predetermined direction aligned with the horizontal direction before the forming operation is performed in the forming. Since the first region of the laminate is held in the horizontal direction, the second region adjacent to the first region is subjected to downward gravity. Thus, the shape maintaining sheet holds the first surface of the laminate so as not to come into contact with the first forming surface, which can appropriately prevent the second region of the laminate from being deformed by the weight.

A forming method according to an eleventh aspect of the disclosure is the forming method according to the eighth or ninth aspect, including performing first detection (S105) of detecting a first tension applied to the first forming sheet when the forming operation is performed in the forming, wherein the forming includes stopping rotation of the forming tool when the first tension detected in the first detection reaches a first predetermined tension.

According to the forming method of the eleventh aspect of the disclosure, the rotation of the forming tool is stopped when the first tension applied to the first forming sheet reaches the first predetermined tension. Thus, it is possible to appropriately maintain a state in which the first forming sheet applies the first predetermined tension to the laminate.

A forming method according to a twelfth aspect of the disclosure is the forming method according to the ninth aspect, including performing first detection of detecting a first tension applied to the first forming sheet when the forming operation is performed in the forming, and performing second detection of detecting a second tension applied to the second forming sheet when the forming operation is performed in the forming, wherein the forming includes stopping rotation of the forming tool when the first tension detected in the first detection reaches a first predetermined tension and the second tension detected in the second detection reaches a second predetermined tension.

According to the forming method of the twelfth aspect of the disclosure, the rotation of the forming tool is stopped when the first tension applied to the first forming sheet reaches the first predetermined tension and the second tension applied to the second forming sheet reaches the second predetermined tension. Thus, it is possible to appropriately maintain a state in which the first forming sheet applies the first predetermined tension to the laminate and the second forming sheet applies the second predetermined tension to the laminate.

A forming method according to a thirteenth aspect of the disclosure is the forming method according to the eighth or ninth aspect, wherein the forming includes stopping rotation of the forming tool when a rotation angle of the forming tool around the rotation axis reaches a predetermined stop angle.

According to the forming method of the thirteenth aspect of the disclosure, the rotation of the forming tool is stopped when the rotation angle of the forming tool around the rotation axis reaches the predetermined stop angle. Thus, it is possible to appropriately maintain a state in which the first forming sheet applies a desired load to the laminate.

A forming method according to a fourteenth aspect of the disclosure is a forming method for forming, by a forming device, a laminate in which a plurality of sheet materials containing reinforced fibers are laminated, wherein the forming device includes a forming tool including a first forming member configured to come into contact with a first surface of the laminate, a second forming member configured to come into contact with a second surface of the laminate, and a maintaining member configured to maintain a state in which a first region of the laminate is sandwiched between the first forming member and the second forming member and disposed along a predetermined direction, and a first forming sheet including one end fixed to the second forming member at a position facing a second region adjacent to the first region, the first forming member includes a first contact surface extending along the predetermined direction while coming into contact with the first region of the laminate, and a first forming surface inclined at a first predetermined angle with respect to the predetermined direction, and the forming method includes forming the laminate, the forming including performing a forming operation of moving another end of the first forming sheet in contact with the second surface of the laminate, thereby pressing the first surface of the laminate against the first forming surface to bend the laminate.

According to the forming method of the fourteenth aspect of the disclosure, the maintaining member maintains the state in which the first region of the laminate in which the plurality of sheet materials containing the reinforced fibers are laminated is sandwiched between the first forming member and the second forming member and disposed along the predetermined direction. The forming includes performing the forming operation of moving the other end of the first forming sheet in contact with the second surface of the laminate, thereby pressing, by the first forming sheet in contact with the second surface of the laminate, the first surface of the laminate against the first forming surface to bend the laminate.

The first forming sheet includes the one end fixed to the second forming member at the position facing the second region adjacent to the first region of the laminate. Thus, when the other end of the first forming sheet is moved by the movement mechanism, the first forming sheet is pressed against the second surface of the laminate, and the first surface of the laminate is pressed against the first forming surface of the first forming member. Since the first forming surface is inclined at the first predetermined angle with respect to the predetermined direction, the second region of the laminate is bent at the first predetermined angle by the forming operation. Thus, it is possible to provide the forming method capable of faithfully bending the laminate along the shape of the forming tool.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A method of forming a laminate, the method comprising:
    providing a laminate comprising a plurality of sheet materials, each sheet material containing reinforcing fibers,
    positioning the laminate in a forming device, the forming device comprising:
        a forming tool, the forming tool comprising:
            a first forming member configured to come into contact with a first surface of the laminate,
            a second forming member configured to come into contact with a second surface of the laminate, and
            a maintaining member configured to maintain a state in which a first region of the laminate is sandwiched between the first forming member and the second forming member and disposed along a predetermined direction, and
        a first forming sheet, wherein:
            one end of the first forming sheet is fixed to the second forming member at a position facing a second region of the laminate adjacent to the first region of the laminate, and
            another end of the first forming sheet is fixed to a first predetermined position,
        wherein the first forming member comprises:
            a first contact surface extending along the predetermined direction which comes into contact with the first region of the laminate, and
            a first forming surface inclined at a first predetermined angle with respect to the predetermined direction, and
    rotating the forming tool around a rotation axis orthogonal to the predetermined direction, thereby pressing the first forming sheet against the second surface of the laminate, and pressing the first surface of the laminate against the first forming surface to bend the laminate.

2. The method of forming a laminate according to claim 1, wherein;
    the forming device further comprises:
        a second forming sheet, wherein:
            one end of the second forming sheet is fixed to the first forming member at a position facing a third region of the laminate adjacent to the first region of the laminate, and
            another end of the second forming sheet is fixed to a second predetermined position,
        wherein the second forming member comprises:
            a second contact surface extending along the predetermined direction which comes into contact with the first region of the laminate, and
            a second forming surface inclined at a second predetermined angle with respect to the predetermined direction, and
    rotating the forming tool around the rotation axis additionally causes pressing of the second forming sheet against the first surface of the laminate, and pressing the second surface of the laminate against the second forming surface to bend the laminate.

3. The method of forming a laminate according to claim 2, further comprising:
    detecting a first tension applied to the first forming sheet during the rotating step,
    detecting a second tension applied to the second forming sheet during the rotating step, and
    stopping rotation of the forming tool when the first tension reaches a first predetermined tension and the second tension reaches a second predetermined tension.

4. The method of forming a laminate according to claim 1, wherein;
    the forming device further comprises:
        a shape maintaining sheet, wherein:
            one end of the shape maintaining sheet is fixed to the first forming member at a position facing the second region of the laminate, and
            another end of the shape maintaining sheet is fixed to a third predetermined position,
    the method further comprises holding, by the forming tool, the laminate between the first forming member and the second forming member with the predetermined direction aligned with a horizontal direction before the step of rotating
    the holding including holding, by the shape maintaining sheet, the first surface of the laminate such that the second region of the laminate does not come into contact with the first forming surface.

5. The method of forming a laminate according to claim 1, further comprising:
    detecting a first tension applied to the first forming sheet during the rotating step, and
    stopping rotation of the forming tool when the first tension reaches a first predetermined tension.

6. The method of forming a laminate according to claim 1, further comprising stopping rotation of the forming tool when a rotation angle of the forming tool around the rotation axis reaches a predetermined stop angle.

* * * * *